UNITED STATES PATENT OFFICE.

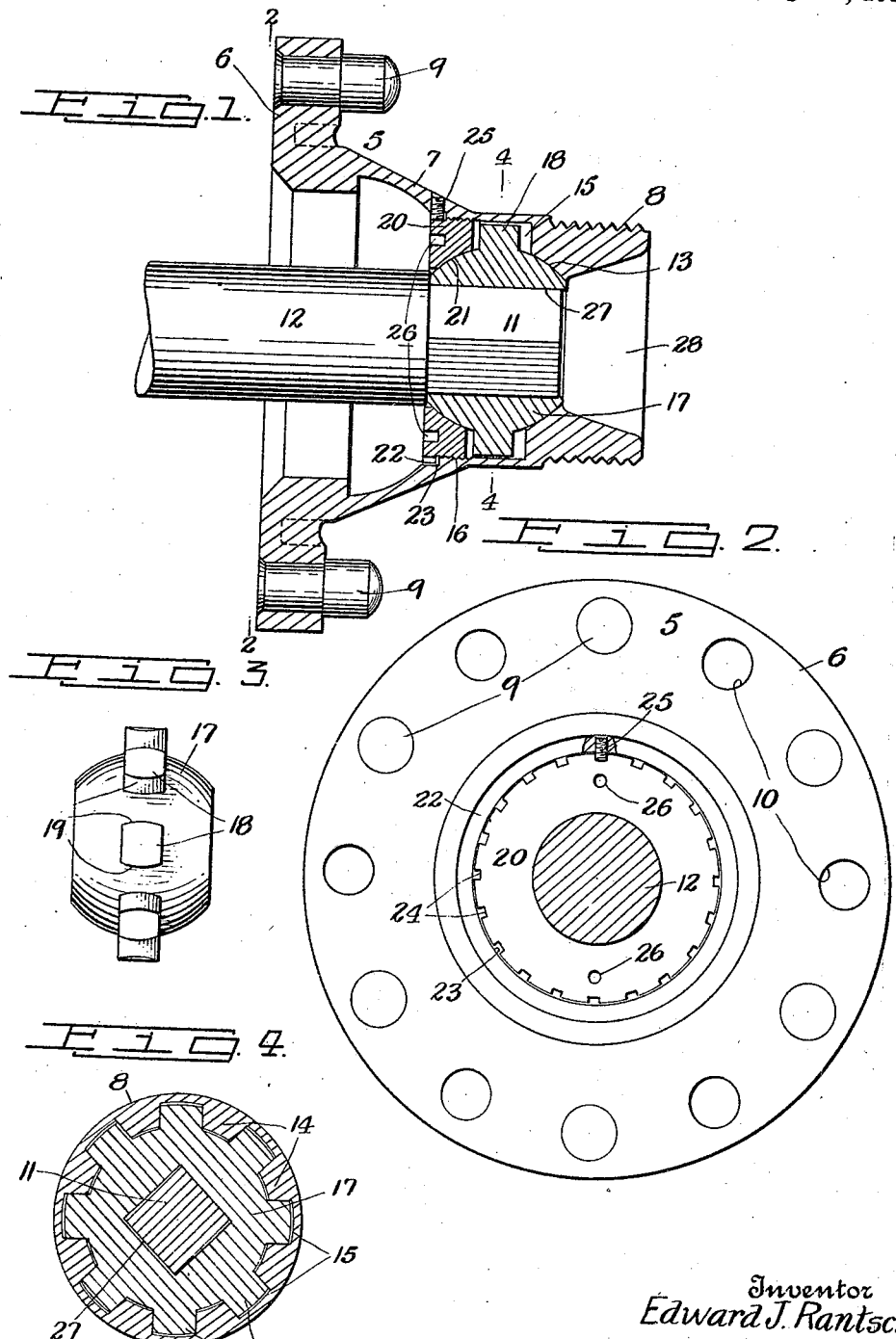

EDWARD J. RANTSCH, OF BROOKLYN, NEW YORK.

AXLE MOUNTING FOR MOTOR VEHICLES.

1,426,009.  Specification of Letters Patent.  Patented Aug. 15, 1922.

Application filed August 8, 1921. Serial No. 490,474.

*To all whom it may concern:*

Be it known that I, EDWARD J. RANTSCH, a citizen of the United States, and residing at Brooklyn, in the county of Kings and State of New York, have invented certain new and useful Improvements in Axle Mountings for Motor Vehicles, of which the following is a specification, such as will enable those skilled in the art to which it appertains to make and use the same.

This invention relates to an improved mounting for the drive or rear axles of motor vehicles, and particularly to the mounting of such axles in connection with the hubs of the rear wheels of a vehicle, and the object of the invention is to provide an improved hub and axle connection or coupling, said hub and axle being of the usual or any preferred form or design, whereby the axle is made capable of automatic self-alinement in said hub as well as in the usual rear or differential housing of the vehicle, by reason of a rotary oscillating or partial universal movement therein afforded by said connection or coupling, and whereby the breaking of the axle will be obviated, or rendered unlikely, and with this and other objects in view the invention consists in a device of the class and for the purpose specified which is simple in construction and operation, and efficient in use and which is constructed and operated as hereinafter described and claimed.

The invention is fully disclosed in the following specification, of which the accompanying drawing forms a part, in which the separate parts of my improvement are designated by suitable reference characters in each of the views, and in which:—

Fig. 1 is a transverse sectional view through a hub of a motor vehicle with an axle extending thereinto and showing my improvement;

Fig. 2 a partial section on the line 2—2 of Fig. 1;

Fig. 3 a detail view of a part of the construction which I employ and show in section in Fig. 1; and, Fig. 4 is a partial section on the line 4—4 of Fig. 1.

In the drawing I have shown, for the purpose of illustrating one use of my invention, the hub 5 of a rear wheel of a "Dodge" motor vehicle and preferably a wheel of the wire type. The hub 5, in the construction shown, comprises a circular disk 6 having an outwardly directed conical portion 7 provided with a tubular and externally threaded extension 8 upon which the usual hub cap, not shown, is mounted. The disk 6 is provided, in the construction shown, with six outwardly projecting pins 9 adapted to pass through the hub portion of the wheel and with a corresponding number of spaced apertures 10 shown in Fig. 2 through which bolts are passed in securing the hub in position, or to the various parts of the wheel construction, not shown.

The hub 5, as usually constructed, is provided with a square aperture or bore adapted to receive the square end or spindle 11 of a rear axle 12 but, in the practice of my invention, I substitute for said square aperture an aperture or bore 13 the walls of which are approximately hemispherical in form in cross section and provided with a plurality of circumferentially arranged teeth or projections 14 forming corresponding recesses 15, and the inner portion of the aperture or bore 13 is enlarged and also threaded as shown at 16 in Fig. 1 of the drawing. The above construction forms, in the hub a clutch member, or device which operates in connection with a corresponding clutch member or device on the end of the axle as hereinafter described.

In practice, I also employ on the end of the axle a clutch member or collar 17, the outer surface of which is arc-shaped in cross section and is provided, centrally of the periphery thereof, with a plurality of projecting teeth 18 arranged circumferentially thereof and corresponding in number to the recesses 15 in the hub 5, and which are adapted to fit and operate in said recesses, but the transverse dimensions of the teeth or projections 18 are less than the corresponding dimensions of said recesses 15, as clearly shown in Fig. 1 of the drawing to permit of the lateral movement of said teeth or projections 18. The adjacent faces of the teeth or projections 18 are rounded or arc-shaped in form as shown at 19 to permit of the slight oscillatory movement of said clutch member 17 in the hub 5 as hereinafter set out.

The clutch member 17 is held in position in the hub 5, or the bore 13 thereof, by an adjustment collar 20, said collar being provided with an arc-shaped face 21 which operates in connection with the clutch member 17, and said collar is also threaded to correspond with the threads 16 in the bore 13, and the inner portion of said collar is provided with an annular projecting flange 22 which operates in a corresponding recess 23 in the bore of the hub 5, and the flange 22 is provided with a multiplicity of notches or recesses 24, in connection with which a set screw 25 passed through the hub 5, or the conical portion 7 thereof, operates to lock said collar in any desired position of adjustment. The inner face of the collar is also preferably provided with spaced apertures 26 by means of which said collar may be adjusted by a suitable spanner wrench.

The clutch member or collar 17 is provided centrally with a square aperture 27 adapted to receive the square end portion 11 of the axle 12, as clearly shown in Figs. 1 and 4 of the drawing. In assembling the various parts of my improvement, or in mounting the axle in connection with the hub 5, the clutch member 17 is first mounted upon the square end portion 11 of the axle after which the axle with the clutch member thereon is mounted in the hub 5 with the teeth or projections 18 of said clutch member in the recesses 15, after which the adjustment collar 20 is mounted in position and adjusted so as to properly hold the clutch member 17 in position and yet permit of the free rotary oscillatory movement of said clutch member in said hub, after which the set screw 25 is moved into operative position and into engagement with one of the notches or recesses 24 in the flange 22 of said adjustment collar. The hub 5 with the wheel and various other parts thereof is then mounted in connection with the housing in the usual manner.

In the use of my improvement it will be apparent that the axle 12 is capable of self-alinement in the housing at all times thus relieving the usual stress on said axle in the event of improper alinement thereof in the construction of a motor vehicle, and further it will be apparent that with my improvement in the event of the axle housing being moved out of alinement caused by an accident or otherwise, my improved self-alining attachment or mounting of the axle in connection with the hub of a rear wheel, within certain limits, will permit of the operation of the vehicle.

It must be understood that the hub 5 and the wheel carried thereby is mounted in connection with and supported in position by the rear housing of the vehicle and that the axle is floating within said housing and does not serve to support the wheel or hub of the wheel. In other words, the wheel and hub are held in proper position and against wobbling by said housing, and when the housing is thrown out of alinement the movement of the axle in the hub will compensate for such improper alinement within certain limits.

Heretofore, in the event of the housing or various other parts of the rear end structure of a motor vehicle getting out of alinement due to accidents or otherwise, it has been impossible, in most cases, to successfully operate the vehicle thus putting operators or motorists at undue inconvenience as well as expense. With my improvement, however, any offset of the rear housing or wheels of a vehicle, or an improper alinement thereof within certain limits, will not effect the successful operation of the vehicle by reason of the ability of the axle to compensate for and remedy such defects in the operation of the vehicle, it being apparent that the axle 12 is capable of a lateral as well as a partial universal movement in the hub due to the mounting of said axle in connection with said hub by the clutch mechanism described. It will also be apparent that the rear wheels are rotated by the axle 12 through the clutch member 17 by reason of the teeth or projections 14 and 18 in the hub 5 and on the clutch member 17 respectively.

One of the chief advantages of my improvement lies in the fact that it prevents breaking of the axle when great stress or strain is thrown thereon, by reason of a wheel dropping into a rut or hole in the road, or striking an obstruction, or by reason of the axle supports being suddenly thrown out of alinement.

With my improved construction, the operative parts of the axle mounting, or the surfaces subjected to friction may be readily lubricated by grease or other lubricant placed in the aperture 28 in the outer face of the hub 5, which grease or lubricant is held in position by the usual hub cap employed.

It will be understood that while I have shown my improvement as employed in connection with the driving axle and the hub of a wheel mounted thereon, I am not necessarily limited in this respect, the broad idea being to provide means for mounting the rear or drive axle of a motor vehicle in connection with its usual supports in such manner as to permit of the self-alinement of said axle therein, and various other changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. An axle mounting of the class described comprising a clutch member mounted in connection with said axle and movable therewith, and said clutch member being mounted in a suitable support in such manner as to permit of lateral movement of said axle in said support.

2. An axle mounting of the class described comprising a suitable support, and means on said axle and movably mounted in said support to permit of the self-alinement of said axle in said support.

3. An axle mounting of the class described comprising a suitable support in connection with which an axle is adapted to be mounted, means on said axle for movably mounting the same in connection with said support to permit of the self-alinement of said axle in said support, and means for holding said first named means in position in said support.

4. An axle mounting of the class described comprising a suitable support in connection with which an axle is adapted to be mounted, means on said axle for movably mounting the same in connection with said support to permit of the self-alinement of said axle in said support, and adjustable means for holding said first named means in position in said support.

5. An axle mounting of the class described comprising a suitable support in connection with which an axle is adapted to be mounted, means on said axle for movably mounting the same in connection with said support to permit of the self-alinement of said axle in said support, adjustable means for holding said first named means in position in said support, and means in said support cooperating with said last named means for holding the same in different positions of adjustment.

6. An axle mounting of the class described comprising a wheel hub member in connection with which an axle is adapted to be mounted, and a clutch member mounted on said axle and adapted to operate in said hub member for securing said axle to said hub member and permitting of the self-alinement of said axle therein.

7. An axle mounting of the class described comprising a wheel hub member in connection with which an axle is adapted to be mounted, a clutch member mounted on said axle and adapted to operate in said hub member for securing said axle to said hub member and permitting of the self-alinement of said axle therein, and an adjustment collar mounted in said hub member and cooperating with said clutch member for holding the same in proper position.

8. An axle mounting of the class described comprising a wheel hub member in connection with which an axle is adapted to be mounted, a clutch member mounted on said axle and adapted to operate in said hub member for securing said axle to said hub member and permitting of the self-alinement of said axle therein, an adjustment collar mounted in said hub member and cooperating with said clutch member for holding the same in proper position, and means for holding said adjustment collar in any position of adjustment.

9. An axle mounting of the class described comprising a wheel hub member in connection with which an axle is adapted to be mounted, said hub member being provided with an arc-shaped aperture having circumferentially arranged projecting members forming intervening recesses, and a substantially spherical clutch member adapted to be secured to said axle and to be mounted in the arc-shaped aperture of said hub member and provided with projecting members adapted to operate in the recesses of said hub member and to cooperate with the projecting members thereof.

10. An axle mounting of the class described comprising a wheel hub member in connection with which an axle is adapted to be mounted, said hub member being provided with an arc-shaped aperture having circumferentially arranged projecting members forming intervening recesses, a substantially spherical clutch member adapted to be secured to said axle and to be mounted on the arc-shaped aperture of said hub member and provided with projecting members adapted to operate in the recesses of said hub member and to cooperate with the projecting members thereof, and a collar adjustably mounted in said hub member and cooperating with said clutch member for holding the same in proper position.

11. An axle mounting of the class described comprising a wheel hub member in connection with which an axle is adapted to be mounted, said hub member being provided with an arc-shaped aperture having circumferentially arranged projecting members forming intervening recesses, a substantially spherical clutch member adapted to be secured to said axle and to be mounted on the arc-shaped aperture of said hub member and provided with projecting members adapted to operate in the recesses of said hub member and to cooperate with the projecting members thereof, a collar adjustably mounted in said hub member and cooperating with said clutch member for holding the same in proper position, and means for holding said collar in any position of adjustment.

12. The herein described means for connecting the drive axle of a vehicle with the hub of a wheel, said means comprising a clutch member in the hub and a clutch member on the end of the axle, said clutch members being capable of a rotary oscillating movement one within the other.

13. The herein described means for connecting the drive axle of a vehicle with the hub of a wheel, said means comprising a clutch member in the hub and a clutch member on the end of the axle, said clutch members being capable of a rotary oscillating movement one within the other, and said clutch members being also provided with a slight lateral and vertical oscillating movement one with reference to the other.

In testimony that I claim the foregoing as my invention I have signed my name in presence of the subscribing witnesses this 6th day of August 1921.

EDWARD J. RANTSCH.

Witnesses:
C. E. MULREANY,
H. E. THOMPSON.